United States Patent [19]
Taniguchi et al.

[11] Patent Number: 4,749,263
[45] Date of Patent: Jun. 7, 1988

[54] REAR CONVERSION LENS SYSTEM

[75] Inventors: Nobuyuki Taniguchi; Yoshiaki Hata, both of Nisinomiya; Takeo Hoda, Kawachinagano; Manabu Inoue, Kobe; Yoshinobu Kudo, Sakai; Hiroshi Ueda, Toyokawa, all of Japan

[73] Assignee: Minolta Camera Kabushiki Kaisha, Osaka, Japan

[21] Appl. No.: 1,082

[22] Filed: Jan. 8, 1987

[30] Foreign Application Priority Data

Jan. 9, 1986 [JP] Japan ........................... 61-2601

[51] Int. Cl.$^4$ .......................... G02B 15/02; G02B 9/12
[52] U.S. Cl. ...................................... 350/422; 350/474
[58] Field of Search .............................. 350/422, 474

[56] References Cited

U.S. PATENT DOCUMENTS 3,490,844 1/1970 Sapp, Jr. .................... 355/40

FOREIGN PATENT DOCUMENTS 54-26721 2/1979 Japan .
56-94318 7/1981 Japan .
56-95210 8/1981 Japan .
57-46224 3/1982 Japan .
59-29214 2/1984 Japan .
59-42513 3/1984 Japan .
59-67511 4/1984 Japan .
59-182414 10/1984 Japan .
60-88916 5/1985 Japan .
60-179712 9/1985 Japan .

Primary Examiner—John K. Corbin
Assistant Examiner—Scott J. Sugarman
Attorney, Agent, or Firm—Price, Gess & Ubell

[57] ABSTRACT

A rear conversion lens system which is removably inserted behind an objective lens of a pseudo telephoto camera upon photographing in a trimming mode is inserted for acquiring a print on which the image of the object is printed of greater size.

The rear conversion lens system fulfills the following condition:

$$1.2 < \frac{f}{\Sigma DR} \cdot \frac{L - L'}{L} < 30.0$$

wherein:
f represents the focal length of the whole optical system when the rear conversion system is inserted,
$\Sigma DR$ represents the axial distance of the rear conversion lens system,
L represents the length of the diagonal line of image format to be printed on a printing paper in case of normal photographing,
L' represents the length of the diagonal line of image format to be printed on a printing paper in case of photographing in a trimming mode.

4 Claims, 3 Drawing Sheets

FNO 5.6 d

−0.5   0.5
Spherical
Aberration

ω=8.8°

---- DM
—— DS

−0.5   0.5
Astigmatism

ω=8.8°

−2.0   2.0 %
Distortion

Spherical Aberration

Astigmatism

Distortion

Spherical Aberration

Astigmatism

Distortion

REAR CONVERSION LENS SYSTEM

BACKGROUND OF THE INVENTION

1. Field of the Invention

This invention relates to a pseudo telephoto camera which makes it possible to take pictures in a "trimming mode" in which information on a selected portion of the field of view of an objective to be printed on a printing paper by enlarging printing is recorded on a negative onto which the whole field of view of the objective lens is projected, so that the information can be used for the enlarging printing, and more particularly it relates to a rear conversion lens system used for converting the focal length of the picture taking optical system of the camera into a longer value.

2. Description of the Prior Art

A pseudo telephoto camera of the above mentioned type has been proposed in Japanese Patent application laid-open number Sho. No. 54-26721. Upon printing, the selected portion of the field of view on the negative is printed on a printing paper at a magnification determined by the information recorded on the negative, so that the resulting print has an image size which is the same as that of a print obtained by printing of a negative produced by a normal photographing using an objective lens whose focal length equals to the pseudo focal length of the camera. Here the greater the printing magnification is, in other words, the smaller the selected portion of the field of view is, the longer the pseudo focal length is and the greater the magnification of the printed image is.

But, when the printing magnification becomes greater, graininess of a printed photo becomes outstanding, so that the upper limit of the printing magnification is limited. This maximum magnification is determined by considering, together with the observer's capability of perception, a brightness condition of a main object, exposure factors such as an aperture value, and characteristics of a film and a printing paper. Assuming that a print of a normal size (8 cm × 12 cm) is made of a negative produced with these conditions being ordinary ones, the maximum printing magnification is approximately three to four times as great as in the case of a normal printing in terms of focal length of the objective lens.

SUMMARY OF THE INVENTION

An object of the present invention is to provide a rear conversion lens system which is removably inserted behind an objective lens of a pseudo telephoto camera so as to make it possible to obtain, by enlargement printing, a printed image of an object being as grainless as that of a print made of a negative which is produced by photographing with use of an objective lens whose focal length is longer than the pseudo focal distance of a conventional pseudo telephoto camera.

To achieve the above object, a rear conversion lens system according to the present invention is removably inserted behind an objective lens of a pseudo telephoto camera upon photographing in a trimming mode and fulfills the following condition:

$$1.2 < \frac{f}{\Sigma DR} \cdot \frac{L-L'}{L} < 30.0 \quad (1)$$

wherein f represents the focal length of the whole optical system including the rear conversion system and the objective lens, $\Sigma DR$ represents the axial distance of the rear conversion lens system, L represents the length of the diagonal line of image format to be printed on a printing paper in case of a normal photographing and L' represents the length of the diagonal line of image format to be printed on a printing paper in case of a pseudo telephoto photographing, i.e., photographing in a trimming mode.

Because the rear conversion lens system for a pseudo telephoto camera is used only in case of the telephoto photographing in the trimming mode, it is sufficient that aberrations of the rear conversion lens system are corrected only about the light ray having a small field of angle. Therefore, it becomes very easy to correct aberrations or the converting magnification can be increased with aberrations kept at the same amounts as with a conventional rear conversion lens system. Furthermore it is not necessary to arrange many lens elements in order to correct aberrations, so that a rear conversion lens system can be constructed compactly.

These will be explained in more detail below.

Firstly, aberrations especially in high degrees tend to be produced at a wide field of angle. Because the rear conversion lens system according to the present invention necessitates only light rays at a selected narrow field of angle, it is unnecessary to correct the above mentioned aberrations. Therefore it is not necessary for this rear conversion lens system to arrange many lens elements for correcting aberrations to a high degree, so that a rear conversion lens system can be constructed very compactly in the direction of the optical axis thereby maintaining the optical performance.

Secondly, the effective aperture of the rear conversion lens system which tends to be large at its image side can be made small because the marginal rays are unnecessary for this kind of rear conversion lens system, so that the rear conversion lens system may become compact also in the diametrical direction.

Thirdly, the converting magnification can be made greater. With a rear conversion lens system used for a normal telephoto photographing, as the converting magnification becomes greater and thus the field of angle becomes narrower, the image plane is inclined to the positive side with respect to a plane perpendicular to the optical axis. However, to use only a selected portion of the field of angle for printing as in the case of the present invention leads to an improvement of optical performance, and, if an inclination of the same amount as a conventional rear conversion lens system is acceptable for the image plane, the converting magnification can become greater.

Condition (1) is provided to construct the rear conversion lens system compactly with a great converting magnification. (L-L')/L of the parameter of condition (1) increases as the enlarging magnification for printing increases. The other parameter f/$\Sigma DR$ is the reciprocal of the axial thickness of the rear conversion lens system, and, when the enlarging magnification is great, the thickness of the rear conversion lens system can be shortened. As a result, the value of the condition (1) increases as the enlarging magnification increases and as the rear conversion lens system becomes compact in the direction of the axis.

If the value of condition (1) exceeds the lower limit, the enlarging magnification becomes small and the rear conversion lens system becomes bulky in size.

On the other hand, if the value of condition (1) exceeds the upper limit, the rear conversion system is hardly manufactured, and the graininess of the printed photo becomes remarkable because the enlarging magnification becomes too great.

In the present invention it is desirable that the rear conversion lens system includes at least a positive lens and a negative lens. This design makes it possible to correct aberrations, especially chromatic aberration and spherical aberration well.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

DETAILED DESCRIPTION OF THE PREFERRED EMBODIMENTS

Figure 1:
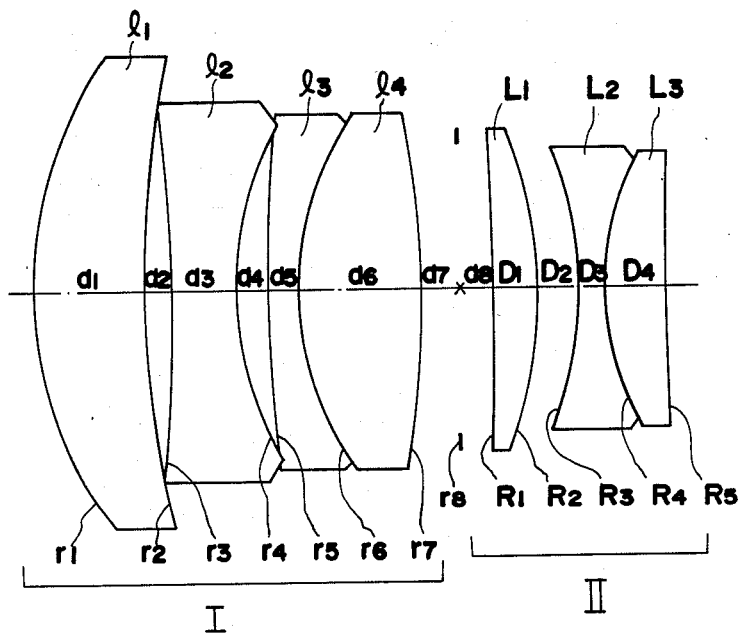
FIG. 1 is a cross sectional view of the whole lens system including an objective lens and a rear conversion lens system according to embodiment 1 of the present invention.
Figure 2:
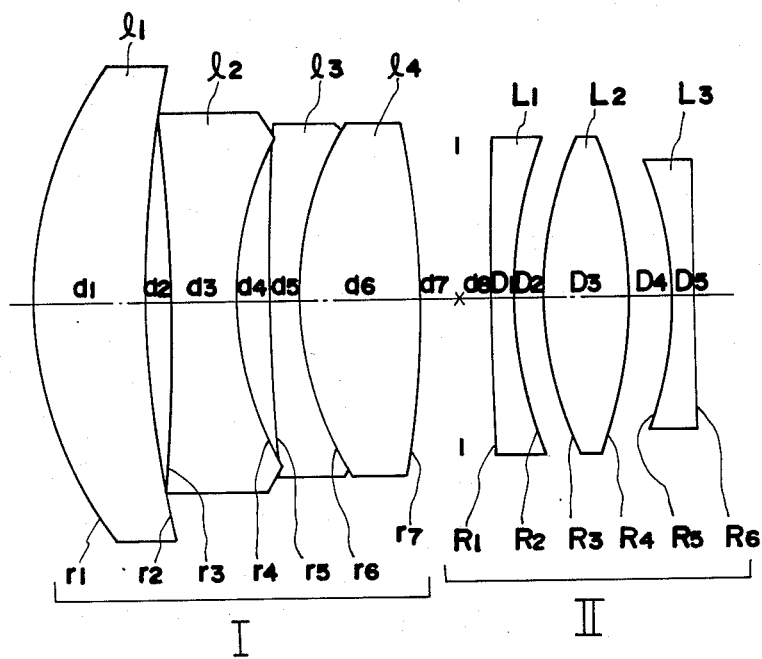
FIG. 2 is a cross sectional view of the whole lens system including an objective lens and a rear conversion lens system according to embodiment 2 of the present invention.
Figure 3:
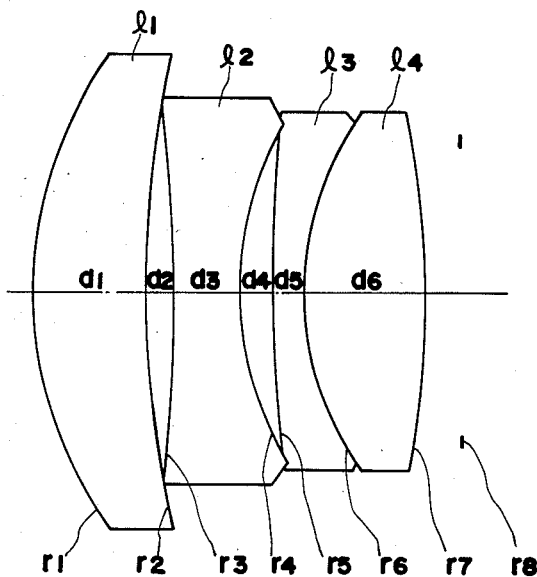
FIG. 3 is a cross sectional view of the objective lens according to the embodiments 1 and 2.
Figure 4A:
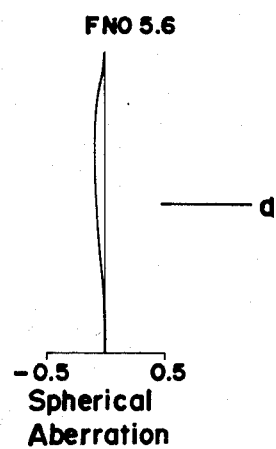
FIGS. 4A to 4C represent the aberration curves of the embodiment 1, respectively.
Figure 4B:
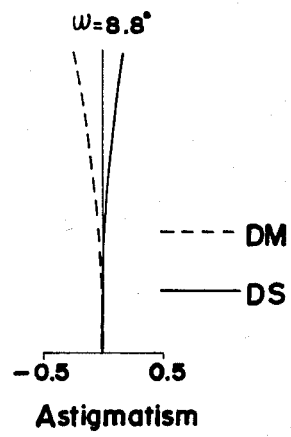
Figure 4C:
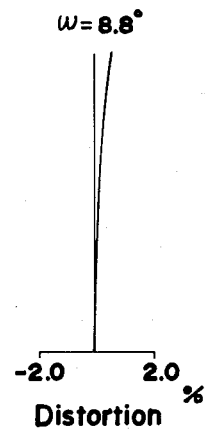
Figure 5A:
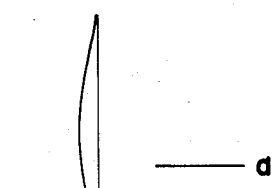
FIGS. 5A to 5C represent the aberration curves of the embodiment 2, respectively.
Figure 5B:
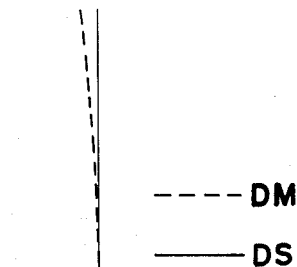
Figure 5C:
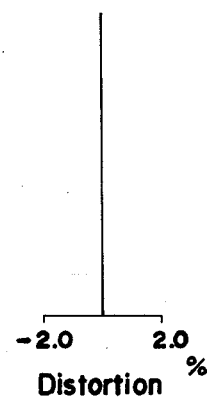
Figure 6A:
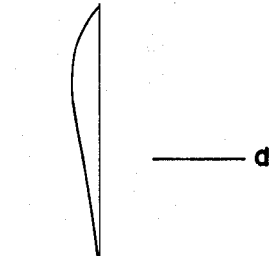
FIGS. 6A to 6C represent the aberration curves of the objective lens of the embodiments 1 and 2, respectively.
Figure 6B:
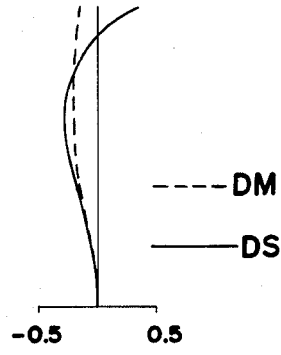
Figure 6C:
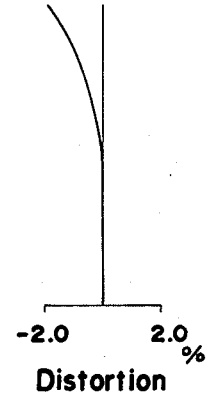

The following description is provided to enable any person skilled in the optical and camera field to make and use the invention and sets forth the best modes contemplated by the inventors for carrying out our invention. Various modifications, however, will remain readily apparent to those skilled in the art, since the generic principles of the present invention have been defined herein specifically to provide a relatively economical and easily manufactured rear conversion lens system. The derivation of the formulas and the relation of the powers set forthe herein can be accomplished with the assistance of a computer. The present invention represents the parameters of a compromise balance of acceptable aberrations which can be relatively easily manufactured to provide a low cost lens system for utilization with a pseudo telephoto camera.

In the drawings, schematic cross sectional views disclose the position of the lens elements. Values of radii of curvature and axial distances for each lens element and air spaces are provided in the accompanying tables set forth herein, and the schematic cross sectional views of the respective embodiments follow the normal conventions of an object at the left-hand side of the drawing and the image plane at the right-hand side.

Table 1 and 2 disclose, respectively, the construction data of an objective lens used in the first and second embodiments of the present invention and table 3 discloses the construction data of an objective lens used in the embodiments of the present invention.

In the tables, f represents the focal length, $F_{No.}$ is minimum F-number, $2\omega$ is field of angle, r and R are respectively the radii of curvature of the objective lens and rear conversion lens with sub-numbers indicating the surface from the object to image side along the optical axis, d and D respectively represent the axial distance including both air spaces and the actual thickness of the objective lenses and rear conversion lens system along the optical axis, ndi and Ndi represents refractive power respectively of objective lens and rear conversion lens to the d ray with the sub numbers indicating lenses from the object to image side, and finally $v_i$ and $v_{di}$ in the Abbe number respectively of objective lens elements and rear conversion lens elements. In the table 1 and 2, the focal length (f*) is the pseudo focal length in case of using the rear conversion lens system.

In the embodiment 1 shown in the table 1 according to the present invention, an objective lens system has a focal length of 35 mm, minimum F-number $F_{No.}=2.8$, so that the pseudo focal length of 70 mm can be obtained for the photographing in a trimming mode. Furthermore when a photo is taken with the rear conversion lens system according to the embodiment 1, inserted behind the objective lens system, a print of the same size as that made of a negative produced by a normal photographing with use of an objective lens having the focal length of 140 mm and $F_{No.}=5.6$ can be obtained by enlarging printing. So in this case the converting magnification of the rear conversion lens system is 2(140/70).

With the embodiment 2 shown in the table 2 the focal length can be converted from 35 mm FNO. 2.8 to 140 mm FNo. 2.8 by photographing in a trimming mode, and, when the rear conversion lens system is inserted behind the objective lens system, a print of the same size as that made of a negative produced by a normal photographing with use of an objective lens with the focal length of 350 mm and FNo.=7.0 can be obtained by enlarging printing. Therefore the converting magnification by the rear conversion lens system according to the embodiment 2 is 2.5

TABLE 1

[Embodiment 1]
objective lens and rear conversion lens
$f^* = 140$  $F_{No.} = 5.6$  $2\omega = 17.6°$

| | radius of curvature | | axial distance | | refractive power | | abbe number |
|---|---|---|---|---|---|---|---|
| I | $r_1$ 12.751 | | | | | | |
| | ($l_1$) | $d_1$ | 3.826 | $nd_1$ | 1.78850 | $v_1$ | 45.7 |
| | $r_2$ 34.311 | | | | | | |
| | | $d_2$ | 0.900 | | | | |
| | $r_3$ −58.870 | | | | | | |
| | ($l_2$) | $d_3$ | 2.247 | $nd_2$ | 1.67270 | $v_2$ | 32.2 |
| | $r_4$ 11.206 | | | | | | |
| | | $d_4$ | 1.078 | | | | |
| | $r_5$ 56.300 | | | | | | |
| | ($l_3$) | $d_5$ | 1.061 | $nd_3$ | 1.65446 | $v_3$ | 33.7 |
| | $r_6$ 10.264 | | | | | | |
| | ($l_4$) | $d_6$ | 4.162 | $nd_4$ | 1.80500 | $v_4$ | 41.0 |
| | $r_7$ −28.811 | | | | | | |
| | | $d_7$ | 1.200 | | | | |
| | $r_8$ ∞(iris) | | | | | | |
| | | $d_8$ | 1.200 | | | | |
| II | $R_1$ −147.897 | | | | | | |
| | ($L_1$) | $D_1$ | 1.574 | $Nd_1$ | 1.52584 | $vd_1$ | 52.1 |
| | $R_2$ −13.842 | | | | | | |
| | | $D_2$ | 1.399 | | | | |
| | $R_3$ −12.340 | | | | | | |
| | ($L_2$) | $D_3$ | 0.944 | $Nd_2$ | 1.78831 | $vd_2$ | 37.3 |
| | $R_4$ 9.542 | | | | | | |
| | ($L_3$) | $D_4$ | 2.086 | $Nd_3$ | 1.85000 | $vd_3$ | 40.5 |
| | $R_5$ 227.137 | | | | | | |

TABLE 1-continued

[Embodiment 1]
objective lens and rear conversion lens
$f^* = 140$  $F_{No.} = 5.6$  $2\omega = 17.6°$

| radius of curvature | axial distance | refractive power | abbe number |
|---|---|---|---|

$$\frac{f}{\Sigma DR} \cdot \frac{L - L'}{L} = 5.8$$

TABLE 2

[Embodiment 2]
objective lens and rear conversion lens
$f^* = 350$  $F_{No.} = 7.0$  $2\omega = 7.1°$

| | radius of curvature | | axial distance | refractive power | | abbe number |
|---|---|---|---|---|---|---|
| I | $r_1$ ($l_1$) | 12.751 | $d_1$ 3.826 | $nd_1$ 1.78850 | $\nu_1$ | 45.7 |
| | $r_2$ | 34.311 | $d_2$ 0.900 | | | |
| | $r_3$ ($l_2$) | −58.870 | $d_3$ 2.247 | $nd_2$ 1.67270 | $\nu_2$ | 32.2 |
| | $r_4$ | 11.206 | $d_4$ 1.078 | | | |
| | $r_5$ ($l_3$) | 56.300 | $d_5$ 1.061 | $nd_3$ 1.65446 | $\nu_3$ | 33.7 |
| | $r_6$ ($l_4$) | 10.264 | $d_6$ 4.162 | $nd_4$ 1.80500 | $\nu_4$ | 41.0 |
| | $r_7$ | −28.811 | $d_7$ 1.200 | | | |
| | $r_8$ | ∞(iris) | $d_8$ 1.200 | | | |
| II | $R_1$ ($L_1$) | 240.884 | $D_1$ 0.773 | $Nd_1$ 1.83400 | $\nu d_1$ | 37.1 |
| | $R_2$ | 13.598 | $D_2$ 0.998 | | | |
| | $R_3$ ($L_2$) | 11.711 | $D_3$ 2.926 | $Nd_2$ 1.62588 | $\nu d_2$ | 35.7 |
| | $R_4$ | −14.604 | $D_4$ 1.525 | | | |
| | $R_5$ ($L_3$) | −11.375 | $D_5$ 0.774 | $Nd_3$ 1.85000 | $\nu d_3$ | 40.5 |
| | $R_6$ | −754.775 | | | | |

$$\frac{f}{\Sigma DR} \cdot \frac{L - L'}{L} = 9.4$$

TABLE 3 objective lens
$f = 35.0$  $F_{No.} = 2.8$  $2\omega = 63.4°$

| radius of curvature | | axial distance | refractive power | | abbe number |
|---|---|---|---|---|---|
| $r_1$ ($l_1$) | 12.751 | $d_1$ 3.826 | $nd_1$ 1.78850 | $\nu_1$ | 45.7 |
| $r_2$ | 34.311 | $d_2$ 0.900 | | | |
| $r_3$ ($l_2$) | −58.870 | $d_3$ 2.247 | $nd_2$ 1.67270 | $\nu_2$ | 32.2 |
| $r_4$ | 11.206 | $d_4$ 1.078 | | | |
| $r_5$ ($l_3$) | 56.300 | $d_5$ 1.061 | $nd_3$ 1.65446 | $\nu_3$ | 33.7 |
| $r_6$ ($l_4$) | 10.264 | $d_6$ 4.162 | $nd_4$ 1.80500 | $\nu_4$ | 41.0 |
| $r_7$ | −28.811 | $d_7$ 1.200 | | | |
| $r_8$ | ∞(iris | | | | |

What is claimed is:

1. A rear conversion lens system, wherein the rear conversion lens system is removably inserted only behind an objective lens of a pseudo telephoto camera upon photographing in a trimming mode, in which a selected portion of a field of view is printed on a printing paper by enlargement printing, comprising a rear conversion lens system which fulfills the following condition:

$$1.2 < \frac{f}{\Sigma DR} \cdot \frac{L - L'}{L} < 30.0$$

wherein:
f represents the focal length of the whole optical system when the rear conversion system is inserted,
ΣDR represents the axial distance of the rear conversion lens system,
L represents the length of the diagonal line of image format to be printed on a printing paper in case of a normal photographing,
L' represents the length of the diagonal line of image format to be printed on a printing paper in case of photographing in a trimming mode.

2. A rear conversion lens system as claimed in claim 1 wherein the rear conversion lens system includes at least one positive lens element and at least one negative lens element.

3. A pseudo telephoto camera including a objective lens and a rear conversion lens system inserted removably behind the objective lens, wherein the objective lens and the rear conversion lens system fulfills the following values:

| | | $f^* = 140$ | $F_{No.} = 5.6$ | $2\omega = 17.6$ | | |
|---|---|---|---|---|---|---|
| | radius of curvature | | axial distance | refractive power | | abbe number |
| I | $r_1$ ($l_1$) | 12.751 | $d_1$ 3.826 | $nd_1$ 1.78850 | $\nu_1$ | 45.7 |
| | $r_2$ | 34.311 | $d_2$ 0.900 | | | |
| | $r_3$ ($l_2$) | −58.870 | $d_3$ 2.247 | $nd_2$ 1.67270 | $\nu_2$ | 32.2 |
| | $r_4$ | 11.206 | $d_4$ 1.078 | | | |
| | $r_5$ ($l_3$) | 56.300 | $d_5$ 1.061 | $nd_3$ 1.65446 | $\nu_3$ | 33.7 |
| | $r_6$ ($l_4$) | 10.264 | $d_6$ 4.162 | $nd_4$ 1.80500 | $\nu_4$ | 41.0 |
| | $r_7$ | −28.811 | $d_7$ 1.200 | | | |
| | $r_8$ | ∞( | $d_8$ 1.200 | | | |
| II | $R_1$ ($L_1$) | −147.897 | $D_1$ 1.574 | $Nd_1$ 1.52584 | $\nu d_1$ | 52.1 |
| | $R_2$ | −13.842 | $D_2$ 1.399 | | | |
| | $R_3$ ($L_2$) | −12.340 | $D_3$ 0.944 | $Nd_2$ 1.78831 | $\nu d_2$ | 37.3 |
| | $R_4$ | 9.542 | | | | |
| | $R_5$ ($L_3$) | 227.137 | $D_4$ 2.086 | $Nd_3$ 1.85000 | $\nu d_3$ | 40.5 |

4. A modified objective lens system for providing a photographic negative of improved quality for enlargement printing comprising, from the object to image side:
an objective lens system capable of providing an acceptable photographic image with a first focal length, and
a rear conversion lens system of at least three lens elements attached on the image side of the objective lens system and capable of providing a second composite pseudo-focal length, in which an area of a film negative, smaller than the normal printing area of a photographic image of just the objective lens, is selectable for enlargement printing with improved quality, wherein the modified objective lens system satisfies the following condition:

$$1.2 < \frac{f}{\Sigma DR} \cdot \frac{L - L'}{L} < 30.$$

wherein:

f represents the second composite focal length of the whole optical system with the rear conversion system attached;

ΣDR represents the axial distance of the rear conversion lens system;

L represents the length of a diagonal line of an image format to be printed on a printing paper in case of normal photographing with only the objective lens system, and L' represents the length of a diagonal line of an image format to be printed on a printing paper in case of photographing with the rear conversion system attached.

* * * * *